United States Patent
Murray

(10) Patent No.: US 10,009,169 B2
(45) Date of Patent: *Jun. 26, 2018

(54) FORMAT-PRESERVING CIPHER

(71) Applicant: Zettaset, Inc., Mountain View, CA (US)

(72) Inventor: Eric A. Murray, Los Gatos, CA (US)

(73) Assignee: ZETTASET, INC., Mountain View, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/200,635

(22) Filed: Jul. 1, 2016

(65) Prior Publication Data
US 2017/0048059 A1    Feb. 16, 2017

Related U.S. Application Data

(63) Continuation-in-part of application No. 15/089,908, filed on Apr. 4, 2016, which is a continuation-in-part
(Continued)

(51) Int. Cl.
G09C 1/04 (2006.01)
H04L 9/06 (2006.01)
(Continued)

(52) U.S. Cl.
CPC .............. H04L 9/0618 (2013.01); G09C 1/00 (2013.01); H04L 9/065 (2013.01); H04L 9/14 (2013.01);
(Continued)

(58) Field of Classification Search
CPC ........ G09C 1/04; H04L 9/0618; H04L 9/0637
(Continued)

(56) References Cited

U.S. PATENT DOCUMENTS 7,864,952 B2    1/2011  Pauker et al.
8,307,206 B2 *  11/2012 Ahuja ................... H04L 63/102
                                              713/168
(Continued)

FOREIGN PATENT DOCUMENTS

EP        1209550 A2    5/2002

OTHER PUBLICATIONS

Yanfei Fan, An efficiency privacy-preserving scheme against traffic analysis in network coding, Apr. 2009, vol. 10, pp. 1-10. (Year: 2009).*
(Continued)

Primary Examiner — Carl G Colin
Assistant Examiner — Viral S Lakhia
(74) Attorney, Agent, or Firm — Asif Ghias

(57) ABSTRACT

A format-preserving cipher including encryption and decryption schemes supporting non-linear access to input data by allowing the selection of portions of data from a potentially larger dataset to be encrypted. The cipher first defines a forward mapping from the allowable ciphertext values to an integer set of the number of such allowable ciphertext values, and a corresponding reverse mapping. It also supports exclusion of a certain set of characters from the ciphering process. An encryption algorithm is provided that encrypts the input plaintext data while preserving its original format and length, and a corresponding decryption algorithm is provided. The cipher advantageously embodies the encryption and decryption of multi-byte values, composite datasets, credit card numbers and discontinuous datasets, thus fitting a variety of industrial needs.

20 Claims, 7 Drawing Sheets

Related U.S. Application Data of application No. 14/557,464, filed on Dec. 2, 2014, now Pat. No. 9,313,023.

(51) Int. Cl.
*H04L 9/14* (2006.01)
*G09C 1/00* (2006.01)

(52) U.S. Cl.
CPC ...... *H04L 2209/24* (2013.01); *H04L 2209/34* (2013.01)

(58) Field of Classification Search
USPC .............................. 380/28, 44; 713/189–190
See application file for complete search history.

(56) References Cited

U.S. PATENT DOCUMENTS

| | | | | |
|---|---|---|---|---|
| 8,605,897 | B2* | 12/2013 | Golic | H04L 63/0435 |
| | | | | 380/44 |
| 8,908,859 | B2* | 12/2014 | Fujisaki | H04L 9/0637 |
| | | | | 380/252 |
| 9,130,909 | B2* | 9/2015 | Yamanaka | H04L 63/0428 |
| 2006/0227965 | A1 | 10/2006 | Zhu et al. | |
| 2008/0310624 | A1 | 12/2008 | Celikkan et al. | |
| 2009/0310778 | A1 | 12/2009 | Mueller et al. | |
| 2011/0103579 | A1* | 5/2011 | Martin | G06F 21/602 |
| | | | | 380/28 |
| 2011/0280394 | A1* | 11/2011 | Hoover | H04L 9/0618 |
| | | | | 380/28 |
| 2012/0039469 | A1* | 2/2012 | Mueller | G06Q 20/12 |
| | | | | 380/252 |
| 2013/0168450 | A1 | 7/2013 | vonMueller et al. | |
| 2014/0108813 | A1* | 4/2014 | Pauker | G06F 21/6218 |
| | | | | 713/189 |
| 2015/0358159 | A1* | 12/2015 | Rozenberg | H04L 9/14 |
| | | | | 380/28 |

OTHER PUBLICATIONS

Bellare, M. et al., "The FFX Mode of Operation for Format-Preserving Encryption", Dept. of Computer Science, University of California, San Diego, Feb. 20, 2010, pp. 1-18, USA.

Black, J. et al., "Ciphers with Arbitrary Finite Domains", Dept. of Computer Science, University of Nevada, Reno, 2013, pp. 1-17, USA.

Gutmann, P., Peter Gutmann on Google Groups, Jan. 26, 1997, pp. 1-3.

Krishnamurthy, S., "Revised Letter of Assurance for Essential Patent Claims: FFX Mode of Operation for Format-Preserving Encryption", Voltage Security, Apr. 2, 2013, pp. 1-3, USA.

Liu, A., "Letter of Assurance for Essential Patent Claims: FFX Mode of Operation for Format-Preserving Encryption", Verifone, 2009, pp. 1-3, USA.

Morris, B. et al., "How to Encipher Messages on a Small Domain Deterministic Encryption and the Thorp Shuffle" Dept. of Mathematics, University of California, Davis, Advances on Cryptography, 2009, pp. 1-29, USA.

* cited by examiner

FORMAT-PRESERVING CIPHER

RELATED APPLICATIONS

This application is a Continuation-in-part of U.S. patent application Ser. No. 15/089,908 filed on Apr. 4, 2016, which is a Continuation-in-part of U.S. patent application Ser. No. 14/557,464 filed on Dec. 2, 2014, now U.S. Pat. No. 9,313,023. The above numbered applications are incorporated herein by reference in their entireties.

FIELD OF THE INVENTION

This invention relates generally to the field of data security and cryptography and in particular to developing ciphering systems that can encrypt and decrypt data while preserving the format of the data.

BACKGROUND ART

Information and data security is an active field of academic and industrial pursuit. With the news of exploitation of software vulnerabilities by hackers and data breaches a commonplace occurrence, it is unsurprising that many academic and professional institutions are focusing their efforts to develop tools, practices and frameworks that aim to make Information Technology (IT) eco-systems more secure against exploitative attacks from domestic and global hackers and adversaries. Cryptography provides indispensable tools to enable data security in an IT environment. The discipline of cryptography is old and established with many different techniques and processes developed over the years.

A common problem when encrypting data and fields in databases is the resulting format of the encrypted data or ciphertext. The input data or plaintext is expected to be in a certain range of values, for example alphanumeric characters or American Standard Code for Information Interchange (ASCII) numbers for databases. However, ciphertext usually consists of bytes that can have any value from 0 to the maximum possible value (i.e. 255 for an 8 bit byte). These out-of-range bytes can break existing routines that process the encrypted data assuming that it was plaintext. A related problem is the size of the plaintext. Database columns are specified for the expected plaintext size. For example, credit card numbers have at most 16 characters each consisting of the ASCII values "0" to "9". Therefore, while developing ciphering algorithms it is desirable to develop such algorithms so that they retain the forward integrity of the IT eco-system where they are deployed by preserving the format of the data that they encrypt.

In as far as producing a cipher algorithm that preserves the format of the original data, there are many teachings available in the prior art. U.S. Publication No. 2006/0227965 A1 to Zhu et al. teaches a scheme for producing a compliant ciphertext for general syntax specification using a secure syntax compliant encryption schema and "locally iterative encryption". In one implementation, an engine partitions a data stream into blocks, and encrypts each block iteratively until syntax compliance conditions are met. A system using the schema can utilize either stream ciphers or block ciphers in different modes. Locally iterative encryption methods are fast and remain at approximately the same speed even as the length of the data stream to be encrypted increases. Besides providing superior processing speed, the locally iterative encryption schema is said to be more robust to errors in the resulting ciphertext and in the resulting decrypted plaintext than conventional syntax compliant encryption techniques. Locally iterative encryption is secure as long as an underlying encryption cipher selected for use in the schema is secure.

U.S. Pat. No. 7,864,952 to Pauker et al. teaches a data processing system that includes format-preserving encryption and decryption engines. A string that contains characters has a specified format. The format defines a legal set of character values for each character position in the string. During encryption operations with the encryption engine, a string is processed to remove extraneous characters and to encode the string using an index. The processed string is encrypted using a format-preserving block cipher. The output of the block cipher is post-processed to produce an encrypted string having the same specified format as the original unencrypted string. During decryption operations, the decryption engine uses the format-preserving block cipher in reverse to transform the encrypted string into a decrypted string having the same format.

U.S. Publication No. 2008/0310624 A1 to Celikkan et al. teaches an encryption apparatus and method for providing an encrypted file system. The encryption apparatus and method of the illustrative embodiments uses a combination of encryption methodologies so as to reduce the amount of decryption and re-encryption that is necessary to a file in the encrypted file system in the event that the file needs to be modified. The encryption methodologies are interleaved, or alternated, with regard to each block of plaintext. In one illustrative embodiment, Plaintext Block Chaining (PBC) and Cipher Block Chaining (CBC) encryption methodologies are alternated for encrypting a sequence of blocks of data. The encryption of a block of plaintext is dependent upon the plaintext or a cipher generated for the plaintext of a previous block of data in the sequence of blocks of data so that the encryption is more secure than known Electronic Code Book encryption methodologies.

U.S. Pat. No. 8,307,206 to Ahuja et al. teaches a scheme of cryptographic policy enforcement where objects can be extracted from data flows captured by a capture device. In one embodiment, the invention includes assigning to each captured object a cryptographic status based on whether the captured object is encrypted. In one embodiment, the invention further includes determining whether the object violated a cryptographic policy using the assigned cryptographic status of the object.

U.S. Pat. No. 8,605,897 to Golic teaches a symmetric-key encryption method for transforming a sequence of plaintext symbols into a sequence of ciphertext symbols, includes an iterative encryption process including: computing an altered current internal state by combining a current internal state with a current memory symbol; computing a next internal state from the altered current internal state; generating a key-stream symbol from the next internal state; verifying whether the generated key-stream symbol satisfies a condition related to data-format/syntax rules; iteratively computing next internal states and iteratively generating key-stream symbols; and iteratively encrypting plaintext symbols by employing next key-stream symbols to obtain the sequence of ciphertext symbols.

As will be known to persons skilled in the art that there are many existing cipher algorithms that can operate in block or stream mode to encrypt and decrypt data. One such popular scheme is a block-cipher running in Counter (CTR) mode as depicted in the encryption mechanism 10 and decryption mechanism 20 of prior art FIG. 1 and FIG. 2 respectively. Encryption mechanism 10 initially combines a nonce 12 with a counter 14, and uses encryption 16 to encrypt this combination with a cryptographic key as shown to produce a key-stream block, which is then Exclusively OR'ed (XOR'ed) with successive bytes of plaintext data stream 18 to produce ciphertext 20. Conversely, decryption mechanism 20 combines nonce 12 with counter 14, and uses cryptographic encryption 16 to produce a key-stream that is XOR'ed with ciphertext 20 to retrieve original plaintext data 18.

A shortcoming of the prior art teachings is that they do not allow encrypting and decrypting data in a random-access or non-linear fashion. The prior art teachings do not allow for a predetermined selection of data from amongst an entire dataset prior to the ciphering process. Such a scheme would have the benefit that a ciphering engine will not need to encrypt and decrypt the entire dataset thereby resulting in performance improvement and streamlining of IT processes.

Furthermore, teachings of the prior art fail to show a mechanism that can take multi-byte values of input plaintext data, where those multi-byte values may or may not be contiguous, and encrypt them into ciphertext or conversely take ciphertext data and decrypt it into corresponding potentially non-contiguous, multi-byte values of plaintext data. Such a scheme would have the benefit of encoding strings of characters or numbers that have special meanings in the context of specific industrial applications and where validation checks downstream from the cipher would preclude the existence of 'invalid' combinations of such string of characters or numbers.

Similarly, the prior art teachings do not teach a scheme for encrypting/decrypting two or more components of a composite plaintext dataset, and then applying two different forward and reversed mappings on those individual components during the ciphering process.

Furthermore, the prior art does not teach efficient ways of encrypting character sets of a dataset that are discontinuously encoded.

OBJECTS OF THE INVENTION

In view of the shortcomings of the prior art, it is an object of the present invention to teach techniques that allow the selection of portions of the data to be encrypted or decrypted from the entire dataset based on predetermined criteria, prior to the ensuing of the ciphering process.

It is a further object of the instant invention to teach techniques that would allow an efficient way to encrypt and decrypt multi-byte data values in a format-preserved manner.

It is a further object of the invention to disclose techniques for ciphering multiple components of a composite plaintext dataset, by applying different forward and reverse mappings on those components during the ciphering process. Such multiple components may also be discontinuously encoded.

It is a further object of the invention to teach techniques for efficiently encrypting discontinuous datasets.

Still other objects and advantages of the invention will become apparent upon reading the detailed description in conjunction with the drawing figures.

SUMMARY OF THE INVENTION

The objects and advantages of the invention are secured by methods of format-preserving encryption and decryption. The invention teaches how to build a cipher that will encrypt a dataset while preserving the format and length of the original data.

The invention allows the selection of the portions of plaintext or original data to be encrypted. Such portions of data could be selected from potentially a much larger dataset based on predetermined criteria. The invention then teaches the determination of the allowable values permitted in the output or ciphertext. It is these allowable ciphertext values that enable the preservation of the format of the original data in the ciphertext. It then creates a forward mapping of the allowable ciphertext values to a set of integer values, and also the creation of a reverse mapping i.e. from the set of given integer values to the corresponding allowable ciphertext values. Of course, the encryption and decryption engines of the cipher being taught by the present invention need to agree on these forward and reverse mappings a priori before the commencement of ciphering.

Data is encrypted and decrypted by the cipher taught by the invention in certain increments or number of bits, let us say S bits. The invention then determines a limiter value as the difference of the maximum number representable in S bits, and the maximum number representable in S bits modulo the number of allowable values in the ciphertext. The cipher taught by the current invention then iterates over the input data or plaintext, and a key-stream. The key-stream can be from a stream cipher such as RC4, or a block cipher in stream mode such as Advanced Encryption Standard (AES) in CTR mode. AES in CTR mode is used in a preferred embodiment.

The invention allows for defining a set of values represented by the S bits in which input data and the key-stream are accessed, to be skipped during the ciphering process. In other words, if certain characters from the input data are to bypass the encryption or decryption processes, the cipher algorithms of the present invention allow such 'excluded' values to be specified. As data and key-stream are iterated over, the algorithm ignores the values of the key-stream that are greater than or equal to the limiter value calculated above. This is crucial to ensure that the ciphertext values will be within the bounds of the allowable of ciphertext values as specified prior to the initiation of the cipher.

The cipher allows for both encryption and decryption capabilities to be implemented according to the teachings of the invention. Specifically, as input data and key-stream is iterated over, encryption of input or plaintext data is accomplished by taking the sum of the forward mapping of the currently accessed chunk of input data and the current key-stream value modulo N, then taking modulo N of this sum thereby producing a final sum, and finally taking the reverse mapping of this final sum to produce the format-preserved encrypted value corresponding to the current chunk of input or plaintext data. N is the number of allowable ciphertext values explained above.

Conversely, decryption of an encrypted chunk of data is accomplished by taking the difference of the forward mapping of currently accessed chunk of input ciphertext data and the current key-stream value modulo N, then taking modulo N of this difference. If this difference is less than 0, adding the number of allowable ciphertext values to this difference to produce a final difference value, and finally taking reverse mapping of this final difference to reproduce the original plaintext data.

As mentioned above, the invention allows for determination of the portions of data from a potentially much larger dataset to be selected for the ciphering process thereby making the data access regime of the cipher of the current invention non-linear. The methods of the invention further teach preferred embodiments well suited for a number of applications in the data security industry. In a preferred embodiment the ciphertext produced by the invention is alphanumeric. Preferably, the number of bits in which chunks of data and key-stream is accessed is 8, thereby conforming to the specifications of the commonly used byte-oriented architectures of the present day IT systems.

Preferably, the invention allows for the specification of an exclusion-list of certain combinations of input bits to be excluded from the ciphering process. In a character-oriented or byte-oriented architecture, such an exclusion-list preferably includes binary characters, unprintable characters, dashes, delimiting characters, etc. Not encrypting the excluded characters allows the ciphertext to maintain the format of the original plaintext. Preferably, the allowable ciphertext values used in the forward and reverse mappings as taught above are non-contiguous. This allows for operating an encryption regime that preserves a non-standard format of plaintext data that has characters segmented in various non-consecutive chunks of allowable and unallowable characters. An example of such non-contiguous ciphertext characters would be an allowable ciphertext of the set of ASCII characters "0123456789ABCDEF" as commonly used to represent hexadecimal values. 0-9 respectively correspond to ASCII values 48-57 and A-F respectively correspond to ASCII values 65-70. Obviously, these value ranges are not contiguous.

In a highly preferred embodiment, the invention allows for the specification of multi-byte values, or a string of allowable characters or values in the ciphertext. This feature is important because in certain encryption regimes only a certain combination or string of allowable characters or values are permitted to keep the integrity of the downstream business processes. For example, while encrypting credit card numbers, a valid banking institution code needs to have a certain value in order to pass the validation checks of business systems downstream from the cipher. Typically, the leading 4-6 digits of the credit card number signify the bank identifier or the banking institution code. It would be desirable to produce ciphertext values so that those downstream validation checks will not be violated, and the present invention allows for such a capability.

In another preferred embodiment the forward mapping from the allowable ciphertext values to the corresponding set of integers as taught above, does not pre-ordain a certain ordering of that set of integers. In yet another preferred embodiment, the invention does not impose the requirement of the predetermination of the portions of data from a potentially much larger dataset.

In another set of advantageous embodiments, the invention allows ciphering of a composite dataset that consists of multiple components. While using the same keystream, each component is encrypted using a different pair of forward mapping and a corresponding reverse mapping explained above. Conversely, each component of the encrypted data can then be decrypted using the same pair of forward/reverse mappings that was used to encrypt it originally, while using the same keystream. Thus a set/pair of forward and reverse mappings are used to encrypt/decrypt the multiple components of the composite dataset while using the same keystream. All other extensions, including multi-byte ciphering explained above, apply to this set of embodiments as well.

In a variation of the embodiment for ciphering credit cards, the format-preserving cipher of the instant invention skips the check-digit of the credit card from encryption/decryption. That is to ensure that the check-digit is valid, according to Luhn or another algorithm, in the final encrypted credit card. This is accomplished by skipping the check-digit during encryption, and then calculating it based on the encrypted digits of the remainder of the credit card. Conversely, the check-digit is skipped during decryption, and then calculated based on the decrypted digits of the remainder of the credit card.

In another set of advantageous embodiments, before encrypting datasets that comprise of character sets that are discontinuously encoded or simply stated, discontinuous, the present invention performs a shift operation. The purpose of the shift operation is to align or shift the discontinuous character sets of the dataset, such that they are all continuous. Once the discontinuous character sets have been shifted by an offset to become one continuously encoded character set, or have simply become continuous, forward and reverse mappings and encryption is carried out as per above teachings. However, encryption produces only an intermediate ciphertext.

The intermediate ciphertext contains unshifted as well as shifted ciphertext characters/values. The shifted ciphertext values may or may not be allowable ciphertext values. To obtain the final ciphertext characters/values, the shifted characters are "shifted back" by the same offset to produce the final format-preserved ciphertext having only the allowable ciphertext values. An advantage of this set of embodiments is improved performance of the cipher while encrypting discontinuous datasets, because the forward and reverse mappings can be implemented by a simple subtraction/addition operation on the corresponding characters.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
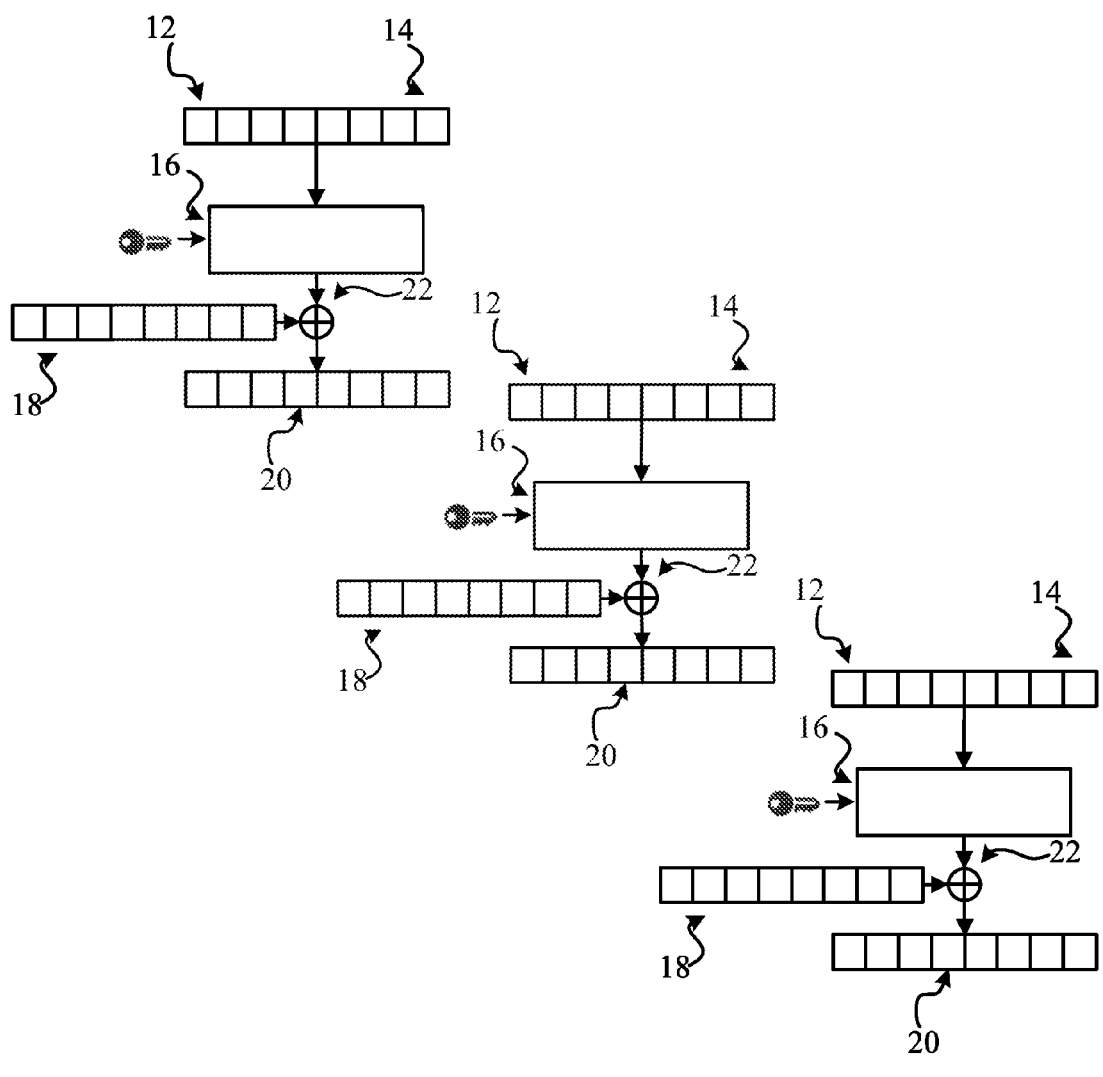
FIG. 1 is a functional view of encryption performed by a block-cipher in Counter (CTR) mode in the prior art.
Figure 2:
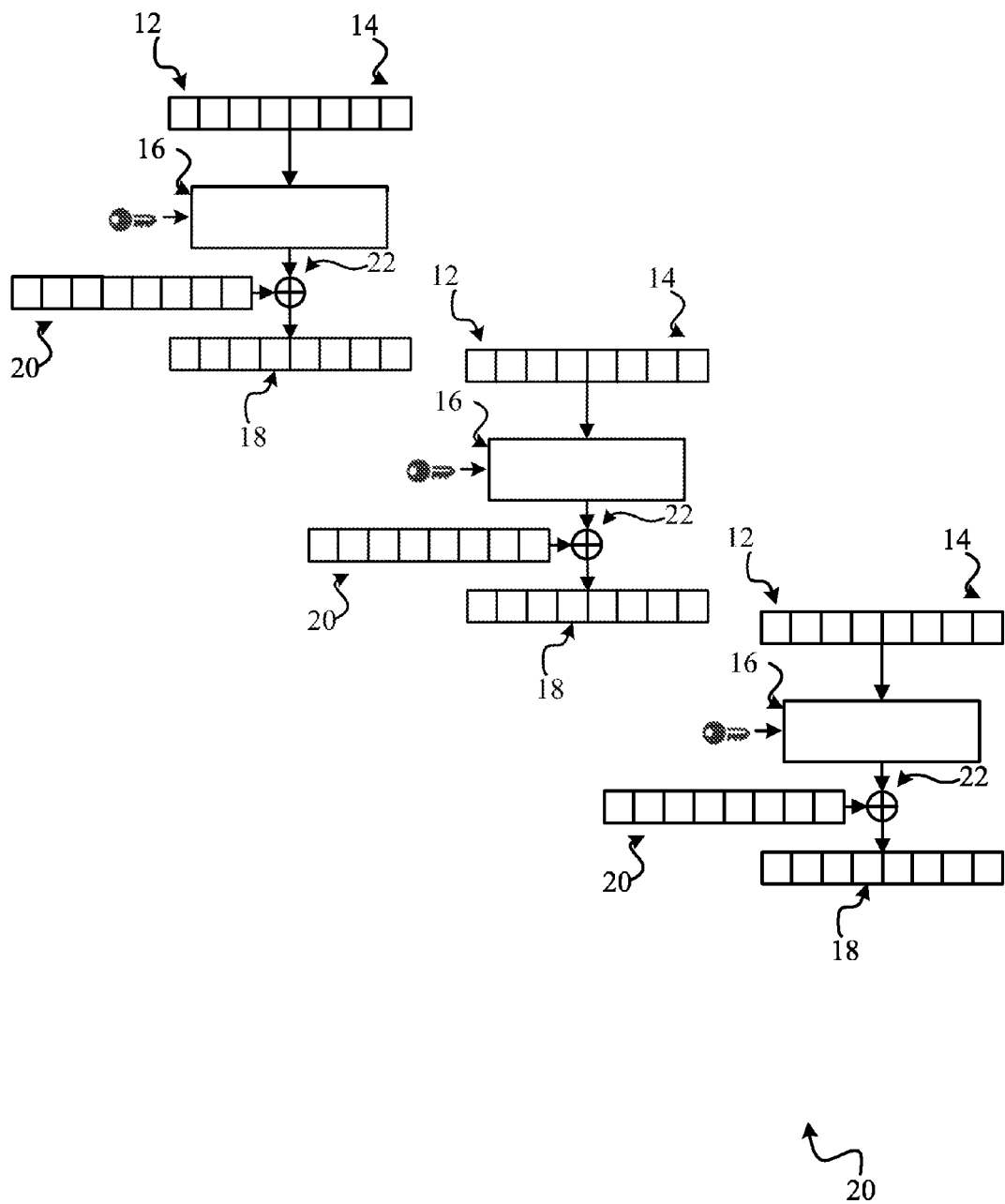
FIG. 2 is a functional view of decryption performed by a block-cipher in Counter (CTR) mode in the prior art.
Figure 3:
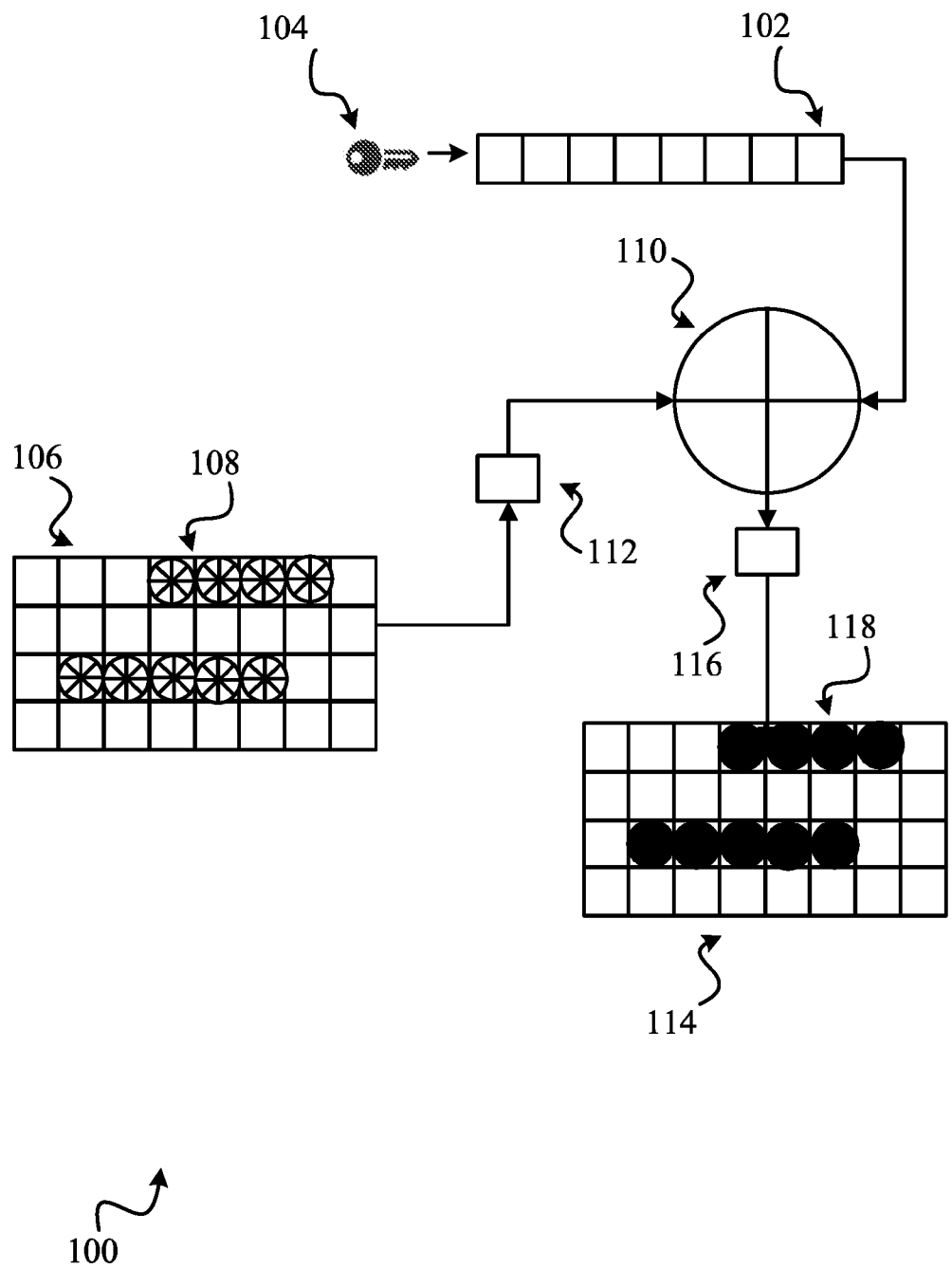
FIG. 3 is a functional view of encryption performed by the format-preserving cipher according to the present invention.
Figure 4:
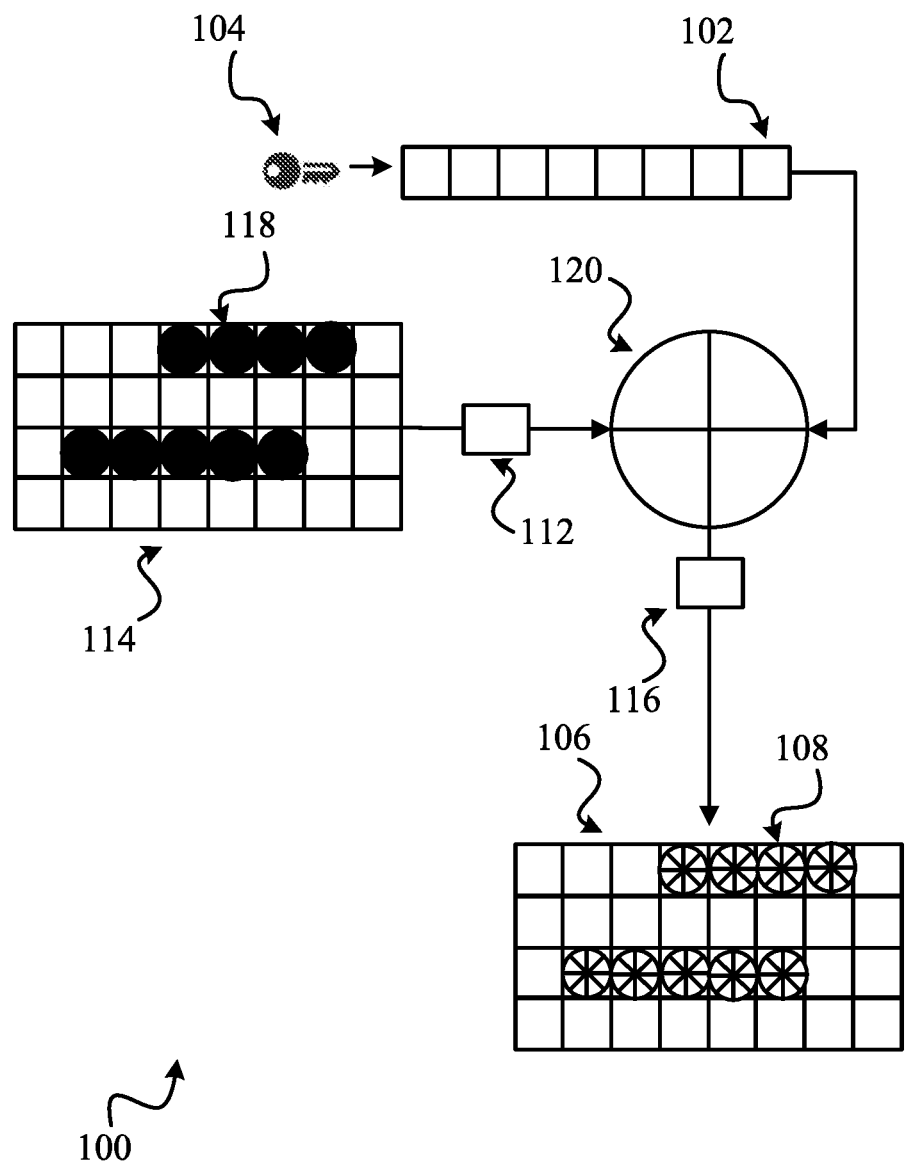
FIG. 4 is a functional view of decryption performed by the format-preserving cipher according to the present invention.

The present invention will be best understood by first reviewing the format-preserving cipher 100 according to the teachings of the current invention as illustrated in FIG. 3 and FIG. 4. The invention teaches how to build a cipher that will encrypt a dataset while preserving the format of the original data. FIG. 3 shows an encryption scheme that uses as input plaintext data 106 and key-stream 102 to produce ciphertext 114. According to the teachings of the current invention, input key-stream 102 can be produced by any existing popular methods, such as, a block-cipher using Counter (CTR) mode, that uses a cryptographic key 104 to encrypt a nonce (not shown) combined with a counter (not shown). Those familiar with the art will recognize that there are many alternative ways of producing a key-stream. For example, Rivest Cipher 4 (RC4), also known as Alleged RC4 or ARCFOUR, is another popular stream cipher that can be easily used by cipher mechanism 100 shown in FIG. 3. Preferably, the key-stream is generated using a block cipher operating in stream mode such as AES in CTR mode, which is the case in a preferred embodiment.

Throughout the following explanation, reference to the input unencrypted data will be made as input plaintext data, original input data or simply plaintext data as is commonly understood in the industry. Similarly reference to encrypted data will be made as encrypted or ciphertext data as is known in the art. It should be noted, that although the term plaintext may seemingly imply that the input data can only be in textual form, the present invention and its teachings are not restricted to ciphering only textual data, but also any other type of data, such as, binary or non-printable data. Because the cryptographic industry refers to the input or unencrypted data as plaintext data, this convention will be adopted in the following teachings to be consistent with the skills and terminology of the art, and as mentioned, the instant invention does not impose any restriction on the format of the original input data.

Furthermore, and as will be understood by those skilled in the art of cryptography, a cipher (or cypher) is referred to a mechanism/method/system/scheme/algorithm for performing encryption or decryption. This will be the meaning attributed to the term cipher or in verb form cipher/ciphering in this disclosure. Therefore, ciphering may refer to either encryption or decryption as will be apparent from the context.

As disclosed by the present invention, cipher mechanism 100 of FIG. 3, first allows the selection of specific portions of data 108 from the overall plaintext dataset 106. In FIG. 3 and FIG. 4 the reference number 106 represents individual data bits or bytes of the entire dataset as squares, while the squares that are filled with circular wheels with cross bars, as denoted by reference number 108, represent bits or bytes of the actual fields or portions of input data that have been selected for the ciphering process.

This initial selection of parts of data to be encrypted is made on predetermined criteria which could be defined based on the requirements of the particular application requiring the format-preserving cipher of the present invention. This pre-selection is important because it lends the ability to the cipher to only encrypt or decrypt certain pieces of data that need to be secured, and not necessarily the entire plaintext dataset. For example, there may be Personally Identifiable Information (PII) or privacy data, such as a social security number (SSN), or Payment Card Industry (PCI) data such as a credit card number (CCN) embedded in the original plaintext dataset. It may not be efficient or possible to encrypt this entire dataset, only a small portion of which is in fact really needed to be secured, in order to meet either external industry compliance requirements, e.g. that of PCI compliance, or an internal company dictate.

Therefore, the predetermined criteria for this initial selection can be based on data security requirements at hand. For example, the criteria could include searching for strings in the input plaintext data that match the format: "nnn-nn-nnnn", where each n denotes a numeric digit. In other words, the criteria searches for any strings of digits that has 3 digits before a dash "-", two digits after that, then another dash and then 4 digits after that. This search string or format represents a social security number. Similarly, the criteria could include searching for patterns like "nnnn nnnn nnnn nnnn", which would represent a search for strings of 16 digits, representing a Visa or Mastercard number and "Exp: mm/yyyy", which would represent a search for the expiration date of the credit card, and so on. People skilled in the art will recognize that one can construct a variety of regular expression searches that would search for a variety of PII, PCI, Healthcare, or other private data in the input plaintext dataset, as the predetermined criteria for selecting the exact portions of input data that need to be secured.

The present invention allows such a non-linear access to data so as to only encrypt or decrypt the specific pieces of data 108 that may indeed need to be protected. Once the pre-selected portions of data 108 are obtained from the overall plaintext dataset 106, the algorithm of the present invention iterates over the plaintext data 108 that needs to be encrypted and feeds this data, along with a keystream 102 to an encryption module 110. It will be understood by those skilled in the art that there are a variety of tools and techniques available to implement such a data access scheme to access portions of data 108 that need to be encrypted from the entire dataset 106 to encryption module 110. For example, one could have an array that is populated with portions 108 of data that are to be encrypted, along with pointers to where those portions 108 of data are located in the entire dataset 106, and then feed those entries of that array to encryption module 110. Such data access techniques are commonplace in the art and will not be discussed in detail in this specification, and are merely represented by process box 112 in FIG. 3.

Subsequently, as illustrated in FIG. 3, encryption module 110 encrypts input data 108 with a value from keystream 102 according to the teachings of the invention as will be explained below, to produce ciphertext 118. The ciphertext 118 is embedded into the original larger dataset 106, where unencrypted data 108 used to be, to produce protected dataset 114. Using our example above, one will take individual portions 118 of ciphertext and use the pointers stored in the above array to embed format-preserved ciphertext according to the current invention, into the original dataset 106, to produce protected dataset 114 as illustrated in FIG. 3. Again, there are a number of tools and techniques available to those skilled in the art for such data insertion schemes to embedded ciphertext portions of data 118 into original dataset 106 and are merely represented by process box 116 in FIG. 3.

Conversely, as illustrated in FIG. 4, cipher mechanism 100 of the current invention has a corresponding decryption mechanism that takes encrypted or ciphertext data 118 from the overall protected dataset 114 obtained above, again using some familiar data access scheme as represented by 112, to access and feed portions of ciphertext data 118 that need to be decrypted along with keystream 102 to a decryption module 120. It then traverses over ciphertext data 118 and keystream 102 to produce plaintext data 108 that after reinsertion, again using a familiar data insertion scheme 116, into input dataset 106 at the original locations, results in the original plaintext dataset 106. In the following explanation, we will take a closer look at the abovementioned encryption and decryption schemes as taught by the current invention.

First to restate, a key advantage of the format-preserving encryption mechanism taught by the present invention is that it allows for non-linear access to input data to be encrypted. That is, the algorithm of the instant invention allows a selection of portions of data from a potentially much larger input plaintext dataset to be encrypted (and decrypted) by the downstream cipher based on a variety of predetermined criteria that may be suitable for a given application. Since there are generally small portions or strings of data that need to be protected in a typically large dataset, such a scheme would result in substantial performance improvements since the whole dataset does not need to be encrypted or decrypted. Specifically referring to FIG. 3 and FIG. 4, selected portions 108 may be a small subset of the overall dataset 106. Moreover, as stated above and will be obvious, the format preserving cipher of the present invention will produce encrypted portions of ciphertext 118 that have the same format and length as the corresponding input plaintext portions 108.

Let us turn our attention to the encryption and decryption cipher scheme taught by the present invention. The parts of the scheme that are invoked each time an encryption or decryption operation of the present invention is performed are depicted by encryption module 110 in FIG. 3 and decryption module 120 in FIG. 4. Note that the below explanation teaches the various steps of the algorithm of the cipher of the instant invention. Skilled artisans will recognize that there will be several ways to implement the below algorithm. As such alternative arrangements of the below steps are possible in the light of a given implementation without deviating from the principles of the invention. For example, as disclosed by the invention, steps of the algorithm that need to happen only once, do not need to be repeated in encryption module 110 or decryption module 120 for each encryption and decryption operation. These 'initialization' steps will be explained in the below teachings. Similarly, other optimizations of the algorithm are possible within the scope of the invention.

According to the format-preserving cipher taught by the present invention, a determination of the N allowable values permitted in the output or ciphertext is first made. Typically this determination stays 'static' during the course of the operation of an encryption/decryption regime. For example, if the format-preserving cipher of the present invention requires the preservation of alpha-numeric format, then these allowable values will be the characters "0" through "9", "a" through "z", "A" though "Z" and any other special characters such as dashes, etc. Such a requirement might exist to encrypt residential or commercial addresses as an example.

Alternatively if the intent is to keep the ciphertext in numeric form, as is the case for Social Security Numbers (SSN) or Credit Card Numbers (CCN), then these allowable values will be "0" through "9" and N will be 10. It is these allowable ciphertext values that enable the preservation of the format of the original data in the output ciphertext. After the determination of these N allowable values, the cipher then creates a forward mapping M of these allowable ciphertext values into a corresponding set of N integer values {0 ... N−1}, and also the creation of a reverse mapping R from the given set of integer values {0 ... N−1} to the corresponding N allowable ciphertext values. Of course, the encryption and decryption engines of the cipher being taught by the present invention need to agree on this forward mapping M and reverse mapping R a priori before the commencement of ciphering operations.

Taking the numeric format-preserving encryption example above, the forward mapping M and reverse mapping R are represented in Table 1 and Table 2 below.

TABLE 1

| Value | Mapping M |
|-------|-----------|
| "0" | 0 |
| "1" | 1 |
| "2" | 2 |
| "3" | 3 |
| "4" | 4 |
| "5" | 5 |
| "6" | 6 |
| "7" | 7 |
| "8" | 8 |
| "9" | 9 |

TABLE 2

| Value | Mapping R |
|-------|-----------|
| 0 | "0" |
| 1 | "1" |
| 2 | "2" |
| 3 | "3" |
| 4 | "4" |
| 5 | "5" |
| 6 | "6" |
| 7 | "7" |
| 8 | "8" |
| 9 | "9" |

This example assumes that data is being encrypted in character sized chunks as will be the case of typical byte-oriented architectures of most computer systems. However the teachings of the present invention are agnostic to the size of such chunks and can be implemented in increments of any given number of bits, let us say S bits. The cipher algorithm then determines a limiter value L as the difference of the maximum number representable in S bits, and the maximum number representable in S bits modulo operation the number N of allowable values in the ciphertext. Mathematically, the limiter value L can be represented by the following equation:

$$L = 2^S - (2^S \bmod N) \quad \text{Eq. (1)}$$

For byte-oriented systems with S=8, obviously:

$$L = 256 - (256 \bmod N) \quad \text{Eq. (2)}$$

The encryption mechanism taught by the current invention then iterates over the portions of input plaintext data that need to be encrypted as identified by reference number 108 in FIG. 3 according to above explanation. Similarly, the decryption mechanism taught by the current invention iterates over the portions of encrypted ciphertext data that need to be decrypted as identified by reference number 118 in FIG. 4 according to above explanation. Let us denote each accessed chuck of S bits of input plaintext data by $PT_j$ and each accessed chunk of encrypted ciphertext data as $CT_j$ where j is a traversal iterator or index over portion PT of plaintext data for encryption or corresponding portion CT of ciphertext data for decryption. The cipher also iterates over key-stream 102 in chunks of S bits. Let us denote each accessed chunk of S bits of key-stream 102 by $KS_i$ where i is a traversal iterator or index over key-stream 102.

In other words, $KS_i$ and $PT_j$ respectively represent the ith key-stream value, and jth plaintext value during the encryption operation of input plaintext, and $KS_i$ and $CT_j$ respectively represent the ith key-stream value, and jth ciphertext value during the decryption operation of encrypted ciphertext. As taught above, preferably, the key-stream is chosen to be the familiar block cipher in CTR mode or an RC4 key-stream. It should be noted that any secure key stream can be used within the scope of the present invention.

The format-preserving encryption and decryption mechanisms of the present invention further allow defining a set of values represented by the S bits in which input data and the key-stream are accessed, to be skipped during the encryption and decryption operations. In other words, if certain characters from the input data are to bypass the encryption or decryption operations altogether, the cipher algorithm of the present invention allows such 'excluded' values to be specified. An example use-case of such an exclusion-list would be dashes of a social security number, thus ensuring that the format-preserving cipher of the present invention will produce encrypted social security numbers that are also in the format "nnn-nn-nnnn". Other examples could include the "." in the domain name of an email address. However doing so will leak the formatting information of the input plaintext into the ciphertext and should be done only if the advantages outweigh this lessening of security.

As input data and key-stream values are iterated over as $PT_j$ and $KS_i$ respectively, the algorithm ignores the values of the key-stream that are greater than or equal to the limiter value L calculated above. This is required to ensure that the ciphertext values will be within the bounds of the allowable of ciphertext values as specified prior to the initiation of the cipher. Similarly, as input ciphertext data and key-stream values are iterated over as $CT_j$ and $KS_i$ respectively, the algorithm ignores the values of the key-stream that are greater than or equal to the limiter value L calculated above. Note, as convenient, we will use the terms input plaintext to represent data being fed to encryption module 110 of FIG. 3, and input ciphertext for encrypted ciphertext being fed to decryption module 120 of FIG. 4.

Let us now turn our attention to the implementation of encryption module 110 and decryption module 120 illustrated in FIG. 3 and FIG. 4 respectively. For encryption module 110 of FIG. 3, as input data 108 and key-stream 102 are iterated over as $PT_j$ and $KS_i$ respectively according to above explanation, encryption of input $PT_j$ is accomplished by taking the sum of the forward mapping M of the currently accessed chunk $PT_j$ of input data and the current key-stream value $KS_i$ modulo N, then taking modulo N of this sum thereby producing a final sum, and finally taking the reverse mapping M of this final sum to produce the format-preserved encrypted value corresponding to the current chunk of input or plaintext data $PT_j$.

Conversely, for decryption module 120 of FIG. 4, decryption of ciphertext data 114 in a given chunk represented by $CT_j$ is accomplished by taking the difference of the forward mapping M of ciphertext value $CT_j$ and the currently accessed value of key-stream 102 represented by $KS_i$ modulo N, then taking modulo N of this difference. If this difference is less than 0, adding the number N of allowable ciphertext values to this difference to produce a resultant value, and finally taking the reverse mapping R of this resultant value to produce the original plaintext value $PT_j$ for the corresponding ciphertext value $CT_j$.

The following pseudo-code represents one implementation of the above algorithm. As stated earlier, it is entirely conceivable to arrive at equivalent and alternative code for the implementation of the above taught cipher within the scope of the instant invention.

Encryption:

```
if KS_i >= L then
        i++ // ignore this key-stream value
    else
        if PT_j != any value defined in the exclusion-list then // do
not encrypt values to be skipped
            p = M(PT_j)
            e = (p + (KS_i mod N)) mod N // encrypt
            output R(e)
            i++ // advance to next key-stream byte
        else
            output PT_j // do not encrypt values to be skipped
        fi
        j++ // iterate to the next data value to be encrypted
    fi.
```

Decryption:

```
if KS_i >= L then
        i++ // ignore this key-stream value
    else
        if CT_j != any value defined in in the exclusion-list then //
do not decrypt values to be skipped
            p = M(CT_j)
            d = (p - (KS_i mod N)) mod N // decrypt
            if d < 0
                d = N + d // subtract abs(d) from N
            output R(d)
            i++ // advance to next key-stream byte
        else
            output CT_j // do not decrypt values to be skipped
        fi
        j++ // iterate to the next data value to be decrypted
    fi.
```

Figure 5:
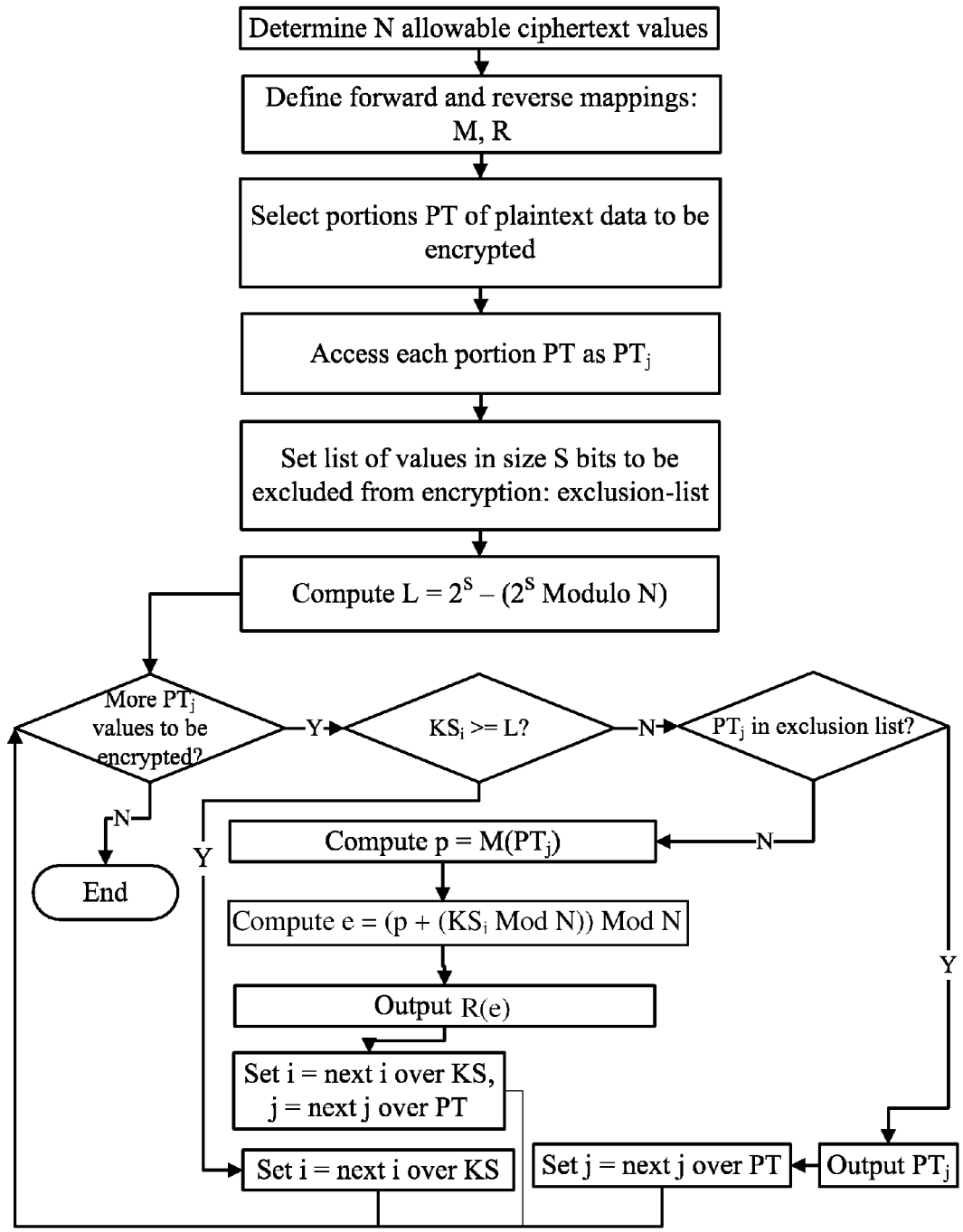
FIG. 5 shows in a flowchart form the steps required to perform encryption according to the format-preserving encryption mechanism taught by the present invention.
Figure 6:
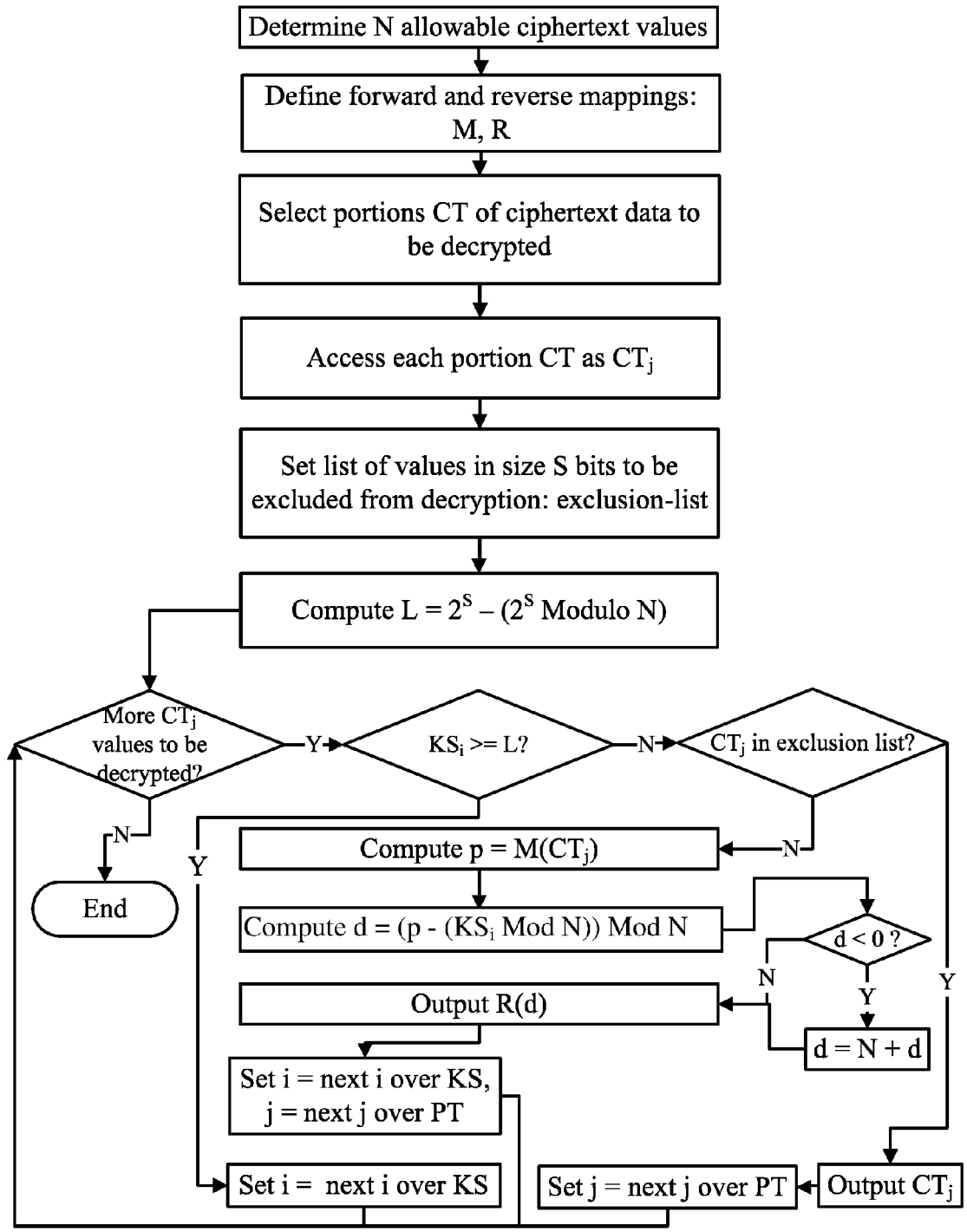
FIG. 6 shows in a flowchart form the steps required to perform decryption according to the format-preserving cipher mechanism taught by the present invention.

FIG. 5 and FIG. 6 show in a flowchart form the encryption and decryption algorithms respectively, of the format-preserving cipher taught by the current invention. Note that in FIG. 5 and FIG. 6, the initialization steps required to set up the initial parameters, including computing the value of limiter L and setting up the exclusion-list are performed first, and then encryption and decryption loops are executed. These loops containing the repeating steps of the cipher will indeed be encapsulated in the respective encryption module 110 of FIG. 3 and decryption module 120 of FIG. 4. It should be further noted, that in a given implementation the common initialization steps required for encryption and decryption may be merged into a common routine, let us say cipher, that can perform both encryption and decryption.

It will be understood by skilled artisans that if key-stream KS is exhausted prior to completion of encryption or decryption of the entire input plaintext or ciphertext datasets respectively, additional key-stream values can be generated depending on the specific algorithm used for key-stream cipher KS. For example, for the block-cipher CTR mode implementation of key-stream cipher, this will be accomplished by incrementing the counter for the CTR mode, and encrypting another block of the required chunk's size worth of nonce and counter combination with the cryptographic key used for the CTR mode.

The methods of the invention teach many preferred embodiments well suited for a number of applications in the data security industry. In a preferred embodiment the ciphertext 114 in FIG. 3 produced by the present invention is alphanumeric. This will be a familiar requirement for a lot of database applications requiring the preservation of alphanumeric format for the tables predefined in the database(s). Preferably, the number of bits S in which chunks of data and key-stream is accessed is 8, thereby conforming to the specifications of the commonly used byte-oriented architectures of the present day IT industry.

As taught above, the invention allows for the specification of an exclusion-list of certain combination of input bits from the ciphering process. In a character-oriented or byte-oriented architecture, such an exclusion-list preferably includes binary characters, unprintable characters, dashes, delimiting characters, etc. Preferably, the allowable ciphertext characters as taught above are non-contiguous. This allows for the specification of an encryption regime that can preserve a non-standard format that may have characters segmented in various chunks of non-consecutive allowable and unallowable values. An example of such non-contiguous ciphertext characters would be an allowable ciphertext of the set of ASCII characters "0123456789ABCDEF" as commonly used to represent hexadecimal values. 0-9 respectively correspond to ASCII values 48-57 and A-F respectively correspond to ASCII values 65-70. Obviously, these value ranges are not contiguous.

In a highly preferred embodiment, the invention allows for the specification of multi-byte values, or a string of allowable characters in the ciphertext. This feature is important because in certain encryption regimes only a certain combination or string of allowable characters or values are permitted to keep the integrity of the downstream business processes. For example, in a credit card number the first six digits, usually referred to as Issuer Identification Number (IIN) contain a valid banking institution code that needs to have certain values in order to pass the validation checks of business systems downstream from the cipher. It would be desirable to produce ciphertext values so that those downstream validation checks will not be violated, and the present invention allows for such a capability.

Taking the above example, the forward mapping M of multi-byte IIN values to the corresponding set of N allowable ciphertext values, according to the teachings of the present invention, is shown in Table 3 below, where values in the first column are exemplary values for valid IIN codes.

TABLE 3

| Value | Mapping M |
| --- | --- |
| "400610" | 0 |
| "400936" | 1 |
| "400937" | 2 |
| "400938" | 3 |
| "400941" | 4 |
| "400942" | 5 |
| "400844" | 6 |
| "401171" | 7 |
| "401106" | 8 |
| . . . | . . . |
| "409311" | N − 1 |

Encryption and decryption proceed in the same manner as the previous embodiments except that size S of bits, as taught above, needs to be chosen such that when input plaintext data is accessed as $PT_j$ or ciphertext data is accessed as $CT_j$ according to the above algorithm, enough bits are accessed to ensure that the entire input multi-byte value can be encrypted or decrypted. Further, when key-stream KS is accessed as $KS_j$, enough bits of the key-stream are accessed so that they can be used to encrypt or decrypt the entire multi-byte value. This is accomplished by ensuring that S divided by 8 is equal to the number of bytes in each of the input multi-byte plaintext value. Of course, the assumption here is that these multi-byte values that need to be encrypted or decrypted are of fixed and equal lengths.

Given this scheme, in the example shown in Table 3 above, the multi-byte values are of 6 bytes in length, that means that S should be chosen to be 48 bits, so that 48 divided by 8 equals 6 bytes, and N is the number of allowed values. The same method for calculating limiter value L of Eq. (1) is used as in earlier embodiments, that is:

$$L = 2^S - (2^S \text{ modulo } N)$$

A single encryption would consume the 6 bytes of plaintext IIN and produce a 6 byte encrypted IIN. After the initial IIN has been encrypted, normal encryption process as explained for the earlier embodiments can resume, where S is selected to be of 'normal' size e.g. 8.

Additionally, as is known to the skilled artisans, that the last character of a CCN is a checksum of the previous digits, and is also known as the check-digit. The skilled artisans will also recognize that such a legitimate check-digit as obtained using the below described scheme would be required to ensure that the sanctity of downstream financial processes and systems is not violated. The check-digit is usually calculated using the Luhn algorithm. To make a fully legitimate format-preserved encrypted CCN, the checksum needs to be recalculated on the encrypted value of the remainder digits of the CCN, using the checksum algorithm for that card which can be determined using the original IIN.

Therefore, during encryption, the check-digit will be left out of the encryption process, or skipped. Once the rest of the CCN has been encrypted, the check-digit will be calculated based on the remainder encrypted digits of the CCN using an appropriate algorithm, which may be the Luhn algorithm. During decryption, and conversely, the check-digit will be skipped. After the rest of the CCN has been decrypted, then the check-digit will be recalculated based on the remainder original digits of the CCN, again using the appropriate algorithm for the application and the banking institution.

It will be obvious to those skilled in the art, that the multi-byte ciphering embodiment presented above can be used for encrypting any multi-byte values and not just credit card numbers. The techniques of the embodiment can be invoked as and when desired during the course of normal character-based or byte-sized encryption regimes implemented by earlier embodiments, and once the desired multi-byte values have been encrypted, normal character-based or byte-sized cipher operations can resume. Of course, the converse is true for the decryption process.

In another preferred embodiment the forward mapping from the allowable ciphertext values to the corresponding set of integers {0 . . . N−1} as taught above, does not pre-ordain a certain ordering of that set of integers. That means, that as long as there is a unique forward mapping M from input ciphertext values to the set {0 . . . N−1} where the values of set {0 . . . N−1} can be in any order, and a corresponding reverse mapping R that uniquely maps values of the set {0 . . . N−1} in any order to the corresponding ciphertext values, the format-preserving cipher taught by the current invention will function properly. This further reduces complexity of implementation in the practice of the instant invention.

In yet another highly preferred variation of the format-preserving cipher according to the invention, two different forward mappings and correspondingly two different reverse mappings are used for two different components of a composite plaintext dataset. An exemplary use of such a variation would be when the plaintext comprises an initial set of T alpha characters, followed by numbers. Then a first forward mapping $M_1$ is defined that maps a first set of $N_1$ allowable ciphertext values to the integer set $\{0 \ldots N_1-1\}$. A second forward mapping $M_2$ is also defined that maps a second set of $N_2$ allowable ciphertext values to integer set $\{0 \ldots N_2-1\}$. Similarly, two reverse mappings $R_1$ and $R_2$ are defined that map the given sets of integer values $\{0 \ldots N_1-1\}$ and $\{0 \ldots N_2-1\}$ to the corresponding $N_1$ and $N_2$ allowable ciphertext values respectively.

The two forward mappings $M_1$ and $M_2$ and the two reverse mappings $R_1$ and $R_2$ are then used to encrypt the alpha component and the numeric component respectively of the plaintext using the above presented encryption algorithm. Similarly, a converse process is used for decryption using the decryption algorithm presented above. Therefore unsurprisingly, in the decryption algorithm, the two forward mappings $M_1$ and $M_2$ and the two reverse mappings $R_1$ and $R_2$ are used to decrypt the alpha component and the numeric component of the plaintext respectively using the above presented decryption algorithm.

As with earlier embodiments, the encryption and decryption engines of the cipher variation being taught will need to agree on the forward mappings $M_1$ and $M_2$, and the corresponding reverse mapping $R_1$ and $R_2$, a priori before the commencement of ciphering operations. Note that the sets of integer values $\{0 \ldots N_1-1\}$ and $\{0 \ldots N_2-1\}$ will always be overlapping as they would both start with 0 and progress onwards, however the corresponding sets of allowable ciphertext values must not overlap in order for encryption and decryption regimes to work properly.

Note further that the same keystream is used for encrypting and decrypting both the alpha and numeric components of the composite plaintext in the above example. Obviously, the invention admits of any other combination of various types of input characters as part of the composite plaintext using the above described scheme. In extensions of the above scheme, three, four or even more sets or pairs of forward/reverse mappings may be employed to encrypt/decrypt multiple components of the composite plaintext.

The encryption and decryption algorithms in pseudo-code for the present variation applied to the above example of using two forward and reverse mappings $M_1$, $M_2$ and $R_1$, $R_2$ for ciphering a composite dataset of an initial T bytes of alpha characters, and the reminder bytes of numeric characters, are now presented below. As will be apparent, subscript 1 in the forward and reverse mappings $M_1$ and $R_1$ is used to represent the mappings used in the ciphering of the alpha component of the composite dataset, and subscript 2 is used to represent the mappings $M_2$ and $R_2$ used in the ciphering of the numeric component of the composite dataset.

As before with earlier embodiments, it is entirely conceivable to produce alternative implementations of the present composite dataset ciphering scheme within the scope of the invention, than the one represented by the below algorithms.

First the two limiter values $L_1$ and $L_2$ are computed using Eq. (1) for integer sets $\{0 \ldots N_1-1\}$ and $\{0 \ldots N_2-1\}$, i.e.

$$L_1 = 2^S - (2^S \text{ modulo } N_1)$$

$$\rightarrow L_1 = (256 \text{ modulo } N_1) / / S = 8 \text{ for byte-sized operation, and}$$

$$L_2 = 2^S - (2^S \text{ modulo } N_2)$$

$$\rightarrow L_2 = (256 \text{ modulo } N_2) / / S = 8 \text{ for byte-sized operation}$$

Encryption:

```
Loop if more PT_j values to be encrypted
    If j <= T // alpha component first
        if KS_i >= L_1 then
            i++ // ignore this key-stream value
        else
            if PT_j != any value defined in the exclusion-list
            then // do not encrypt values to be skipped
                p = M_1(PT_j)
                e = (p + (KS_i mod N_1)) mod N_1 // encrypt
                output R_1(e)
                i++ // advance to next key-stream byte
            else
                output PT_j   // do not encrypt values to be
        skipped
            fi
            j++   // iterate to the next data value to be
    encrypted
        fi
    else then // now numeric component
        if KS_i >= L_2 then // alpha component first
            i++ // ignore this key-stream value
        else
            if PT_j != any value defined in the exclusion-list
            then // do not encrypt values to be skipped
                p = M_2(PT_j)
                e = (p + (KS_i mod N_2)) mod N_2 // encrypt
                output R_2(e)
                i++    // advance to next key-stream byte
            else
                output PT_j   // do not encrypt values to be
        skipped
            fi
            j++   // iterate to the next data value to be
    encrypted
        fi
    fi
End Loop.
```

Decryption:

```
Loop if more CT_j values to be decrypted
    If j <= T // alpha component first
        if KS_i >= L_1 then
            i++ // ignore this key-stream value
        else
            if CT_j != any value defined in in the exclusion-list
            then // do not decrypt values to be skipped
                p = M_1(CT_j)
                d = (p - (KS_i mod N_1)) mod N_1 // decrypt
                if d < 0
                    d = N_1 + d // subtract abs(d) from N_1
                output R_1(d)
                i++   // advance to next key-stream byte
            else
                output CT_j // do not decrypt values to be
        skipped
            fi
            j++ // iterate to the next data value to be
    decrypted
        fi
    else // now numeric component
        if KS_i >= L_2 then
            i++ // ignore this key-stream value
```

```
        else
            if CT_j != any value defined in in the exclusion-list
        then // do not decrypt values to be skipped
                p = M_2(CT_j)
                d = (p - (KS_i mod N_2)) mod N_2 // decrypt
                if d < 0
                    d = N_2 + d // subtract abs(d) from N_2
                output R_2(d)
                i++   // advance to next key-stream byte
            else
                output CT_j // do not decrypt values to be
skipped
            fi
            j++ // iterate to the next data value to be
decrypted
        fi
    fi
End Loop.
```

As already stated above, it is conceivable to have alternative ways of implementing the encryption and decryption algorithms of the composite dataset ciphering scheme of the present variation within the scope of the invention, rather than represented by just the above provided pseudo-code.

In yet another set of useful embodiments of the instant invention, a shifting operation is carried out on discontinuous plaintext datasets prior to encryption. Now let us take a closer look at these embodiments.

Oftentimes, the plaintext data can have two discontinuously encoded character sets. An example of such a discontinuous plaintext dataset would be the set of ASCII characters "0123456789ABCDEF" commonly used to represent hexadecimal values. 0-9 respectively correspond to ASCII values 48-57 and A-F respectively correspond to ASCII values 65-70. Obviously, these value ranges are discontinuously encoded, or simply stated are discontinuous.

In the present embodiments, prior to encryption, a shifting operation preferably carried out by a shifting module is first applied. Specifically, an offset between the discontinuous character sets of the data is first determined. Then all the characters in one of the discontinuous character sets are shifted by this offset such that both the character sets become one continuous character set, or simply stated become continuous.

Let us assume per above example, that the plaintext data comprises of ASCII characters "0123456789ABCDEF" representative of hexadecimal values or base 16 characters. The dataset consists of two character sets, "0123456789" and "ABCDEF", encoded respectively in decimal as 48-57 and 65-70. Obviously this encoding is discontinuous, because 65 is not consecutive after 57. Therefore, in the present embodiments, a shifting mechanism first determines the offset between the character set 48-57 and the character set 65-70. Since each of these character sets is continuous in itself, the highest number of the smaller character set is subtracted from the lowest number of the higher character set and the result decremented by one to produce the offset. In the above example, offset=65−57−1=7.

Once the above offset is computed, then prior to encryption, each character of the second or higher character set is shifted by subtracting the offset from it. Using this scheme:
"A" gets encoded as 65−7=58, corresponding to ":" in =ASCII,
"B" gets encoded as 66−7=59, corresponding to ";" in =";" ASCII,
"C" gets encoded as 67−7=60, corresponding to "<" in =ASCII,
"D" gets encoded as 68−7=61, corresponding to "=" in ="=" ASCII,
"E" gets encoded as 69−7=62, corresponding to ">" in =ASCII, and
"F" gets encoded as 70−7=63, corresponding to "?" in ="?" ASCII.

An advantage of such a shifting operation to produce a continuous dataset prior to encryption is that the forward and reverse mapping according to the above teachings can be defined by a simple subtraction or addition operation. In the example above, forward mapping M can be defined as simply the ciphertext or plaintext character minus 48. Thus, forward mapping M for "0" simply becomes "0"−48=48−48=0, for "9" it simply becomes "9"−48=57−48=9, for "A" it simply becomes "A"−48=58−48=10, and for "F" it simply becomes "F"−48=63−48=15.

Table 4 and 5 below provide the complete forward mapping M and reverse mapping R of the above example, in accordance with the present embodiments.

TABLE 4

| Value | Mapping M |
|---|---|
| "0" | 0 |
| "1" | 1 |
| "2" | 2 |
| "3" | 3 |
| "4" | 4 |
| "5" | 5 |
| "6" | 6 |
| "7" | 7 |
| "8" | 8 |
| "9" | 9 |
| "A" | 10 |
| "B" | 11 |
| "C" | 12 |
| "D" | 13 |
| "E" | 14 |
| "F" | 15 |

Conversely, reverse mapping R is implemented by adding (instead of subtracting) 48 to the value.

TABLE 5

| Value | Mapping R |
|---|---|
| 0 | "0" |
| 1 | "1" |
| 2 | "2" |
| 3 | "3" |
| 4 | "4" |
| 5 | "5" |
| 6 | "6" |
| 7 | "7" |
| 8 | "8" |
| 9 | "9" |
| 10 | "A" |
| 11 | "B" |
| 12 | "C" |
| 13 | "D" |
| 14 | "E" |
| 15 | "F" |

Note the variation in the present embodiments when compared to the earlier embodiments directed at composite datasets. A composite plaintext dataset may consist of a first component, a second component and so on, each employing its corresponding forward/reverse mapping of the cipher. In comparison, the present embodiments are directed at datasets that may have multiple character sets each having different encoding domain.

For example, "THE QUICK BROWN FOX JUMPS OVER THE LAZY DOG134590" is a composite dataset consisting of two components, a first component of 35 ALPHA-CAP characters (and spaces), and a second component of 6 Numeric characters. Each of these components can have a corresponding forward/reverse mapping as taught above in the embodiments related to composite datasets. Of course, the composite dataset can have more than two such components as already stated.

In comparison, according to the present embodiments, "THE QUICK BROWN FOX JUMPS OVER THE LAZY DOG134590" contains two discontinuous character sets, 0-9 and A-Z. After the shifting operation, a single continuous character set would be formed containing characters 0-9:;<=>?@A-S. The reader is directed here to a standard ASCII/Decimal conversion chart. Then a single set of forward/reverse mapping employing a simple subtraction/addition operation can be employed in accordance with the present embodiments, and as already explained in reference to the example of Tables 4-5, and with the recognition that character G is shifted by offset 7 to characters @, and characters H-Z are shifted by offset 7 to characters A-S respectively.

It will be obvious that while the components in the embodiments related to composite data sets are directed at the actual length/number of the characters in the plaintext, the present embodiments instead are directed at the coding of the characters in the plaintext rather than their number/length.

Those skilled in the art will recognize that a single set of forward/reverse mappings that are implementable by a simple subtraction/addition by a constant value, are much more efficient to implement than traditional data structures and arrays. That is because the typical overheads of using arrays or other data structures required to "remember" the mapping or offset for each character can be avoided. Instead, a simple subtraction or addition of the character being processed by a constant value (48 in the above examples) based on a shifted offset (7 in the above examples), is all that is required for the mapping. Such an efficient processing can avoid expensive "lookups", and can yield significant performance improvements of the present cipher over traditional techniques, while ciphering discontinuous datasets consisting of discontinuously encoded character sets.

Once the shifting operation has been carried out on a discontinuous dataset as explained above, encryption can commence as usual per prior teachings. The key difference of course is the fact that the forward/reverse mappings can be implemented much more cheaply by a simple subtraction/addition of a constant value. The encryption produces an intermediate ciphertext that comprises of unshifted characters as well as shifted characters or characters belonging to the shifted character set. The shifted characters may consist of allowable and unallowable ciphertext characters/values. The shifted characters are then shifted back by the same offset to produce the final format-preserved ciphertext comprising only of the allowable characters.

Using the above example of Tables 4-5, the intermediate ciphertext would consist of "0123456789:;< >?". Then characters belonging to the shifted character set ":;< >?" of the ciphertext are shifted back by 7 to produce the allowable base 16 characters "0123456789ABCDEF". Specifically, this "shifting back" is accomplished by adding our previously computed offset 7 to each of the shifted characters produced by encryption. More specifically still, ":" is shifted back to be 58+7=65 i.e. "A" in ASCII,
";" is shifted back to be 59+7=66 i.e. "B" in ASCII,
"<" is shifted back to be 60+7=67 i.e. "C" in ASCII,
"=" is shifted back to be 61+7=68 i.e. "D" in ASCII,
">" is shifted back to be 62+7=69 i.e. "E" in ASCII, and
"?" is shifted back to be 63+7=70 i.e. "F" in ASCII.

Similarly, let us take our second example above of "THE QUICK BROWN FOX JUMPS OVER THE LAZY DOG134590" for which we produced a single continuous character set 0-9:;<=>?@A-S after the shifting operation. In this case, the shifted characters in the intermediate ciphertext will be the set:;<=>?@A-S and will need to be shifted back to produce final ciphertext values consisting only of characters 0-9 and A-Z.

Figure 7:
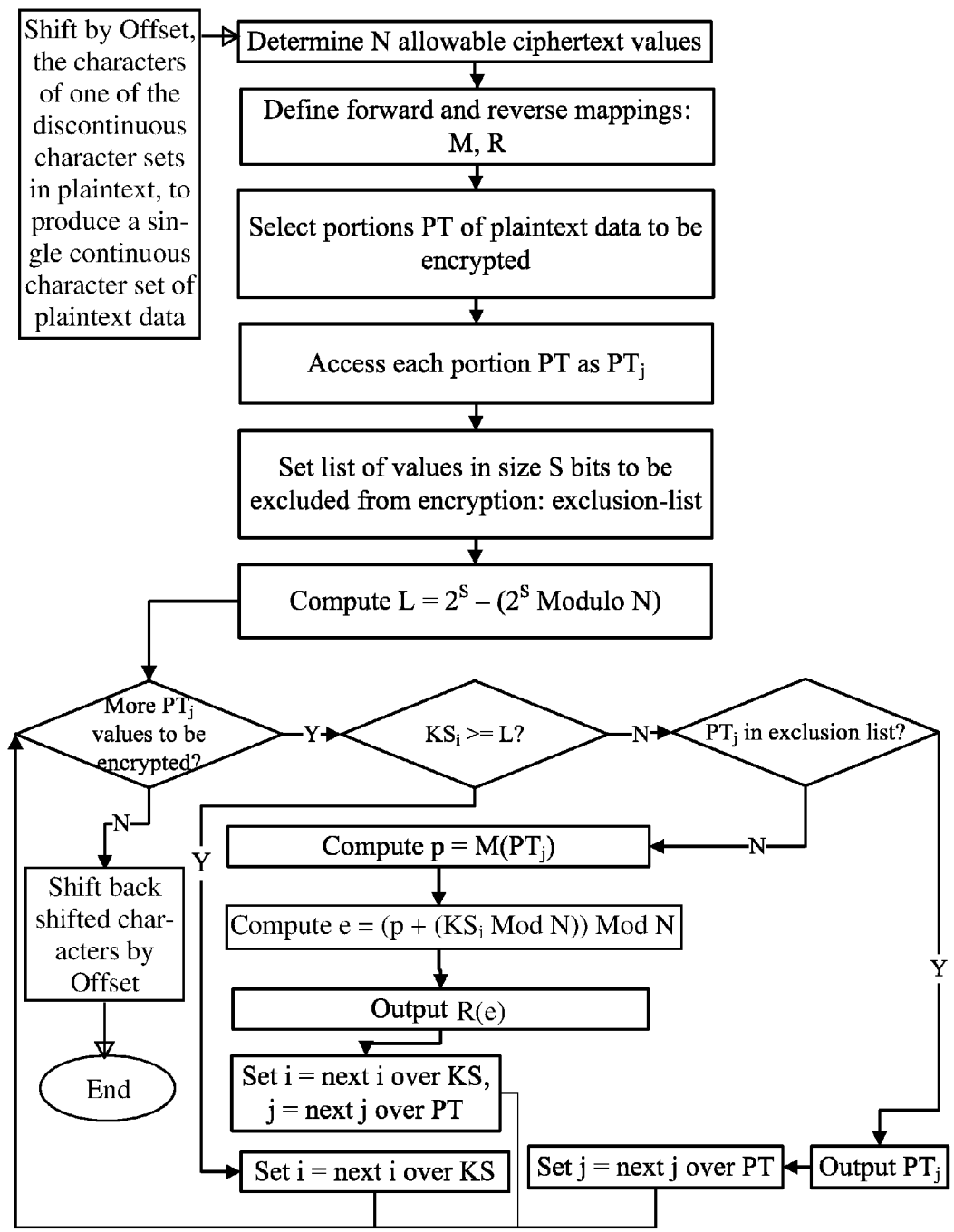
FIG. 7 is a variation of the flowchart of FIG. 5, incorporating the steps needed to carry out encryption of datasets with discontinuous character sets.

FIG. 7 illustrates in a flow-chart form the steps required to implement the present embodiments for encrypting datasets with discontinuous character sets. It should be noted that in the present embodiments, the decryption process remains unchanged because the final ciphertext produced by above encryption is indistinguishable as to whether or not a shifting operation was applied. Obviously that is because of the "shift back" operation applied on the intermediate ciphertext as explained above. The key advantage of course, is the computational efficiency afforded by the above techniques for the encryption of discontinuous character sets. All other related teachings and extensions of the earlier embodiments taught above still apply to the present embodiments.

Since credit card numbers typically only contain numeric digits, the present embodiments may be suitable for financial account numbers containing alpha, numeric and any other characters. Since after the shift operation, the plaintext dataset consists of one continuous dataset, the corresponding ciphertext values will also be a continuous dataset. As such forward mapping M and reverse mapping R will be defined with respect to contiguous ciphertext values.

It should be further noted that for clarity, the above examples had only two discontinuous character sets in the plaintext. However, the present embodiments admit of having more than two discontinuous character sets. In such a scenario, each discontinuous character set is shifted by its offset to be continuous with the rest of the character sets. Obviously, each discontinuous character set will have a corresponding offset, by which it will need to be shifted prior to encryption and shifted back after encryption, as explained above. Once all discontinuous character sets have been shifted to be continuous, forward mapping M and reverse mapping R can be defined, and encryption and decryption implemented per above teachings.

Note further that while in the above examples, we have shifted the higher character set to be continuous with the lower character set, the invention admits of no such restriction. In other words, lower character set 0-9 can be shifted by an addition to higher character set A-F in the above example of Tables 4-5. Similarly, the constant value (e.g. 48) as well as the offset (e.g. 7) to be added/subtracted may be positive or negative numbers, depending on the order and choice of the character sets applied in the shifting operation. Note also that within the scope of the invention, the shifting operation may be carried out on the whole plaintext dataset prior to encryption or a portion thereof. The number of such design choices will be plenty to the skilled artisan.

In view of the above teaching, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. A method of format-preserving ciphering, comprising the steps of:
   (a) providing predetermined criteria for selecting a portion of plaintext data to be ciphered, said portion consisting of two discontinuously encoded character sets;
   (b) shifting each character of one of said two discontinuously encoded character sets by an offset to produce one continuously encoded character set of said portion;
   (c) providing a forward mapping from N allowable ciphertext values for the ciphering of said continuously encoded character set, to an integer set {0 ... N−1}, and a corresponding reverse mapping from said integer set {0 ... N−1} to corresponding said N allowable ciphertext values;
   (d) iteratively accessing said continuously encoded character set in increments of size S bits, where S is set according to an application of said format-preserving ciphering;
   (e) providing a key-stream and iteratively accessing it in increments of said size S bits;
   (f) determining a limiter value L as $2^S$ minus ($2^S$ modulo N);
   (g) ignoring in said ciphering any said accessed key-stream value in said size S bits, if said key-stream value is greater than or equal to said limiter value L;
   (h) allowing zero or more combinations of said S bits in said portion to be skipped from said ciphering;
   (i) encrypting said portion in an encryption module by taking the sum of said forward mapping of said accessed continuously encoded character set in (d) above and modulo N of said accessed key-stream value in (e) above, taking modulo N of said sum to produce a final sum, taking said reverse mapping of said final sum to produce a result, and shifting back in said result by said offset, each character corresponding to said one of said two discontinuously encoded character sets.

2. The method of claim 1, where said format-preserving ciphering preserves an alpha-numeric format of said plaintext data.

3. The method of claim 1, where S is equal to 8 and thus representing said increments of said size S to be bytes.

4. The method of claim 1, where said combinations of said S bits in step 1(h) above represent characters selected from the group consisting of binary characters, unprintable characters, dashes and delimiting characters.

5. The method of claim 1, where said integer set {0 ... N−1} in said forward mapping and said reverse mapping is in no particular order.

6. The method of claim 1, where said key-stream utilizes a stream cipher.

7. The method of claim 1, where said forward mapping maps said allowable ciphertext values as multi-byte values to said integer set {0 ... N−1}, and said corresponding reverse mapping maps said integer set {0 ... N−1} to corresponding said multi-byte allowable ciphertext values, and said size S divided by 8 equals to the number of bytes in each said multi-byte value.

8. The method of claim 1, where said format-preserving ciphering is used to implement a stream-cipher.

9. The method of claim 1, where said portion is a composite dataset comprising a plurality of components and further defining said forward mapping and said reverse mapping uniquely for each of said plurality of components.

10. The method of claim 9, where each of said plurality of components is selected from the group consisting of alpha characters, numeric characters, special characters and binary characters.

11. A system of format-preserving ciphering, comprising:
   (a) at least one portion of plaintext data to be ciphered, said at least one portion selected from said plaintext data based on predetermined criteria and said at least one portion consisting of a continuously encoded character set formed by shifting by an offset each character of one of two discontinuously encoded character sets in said at least one portion;
   (b) a forward mapping from N allowable ciphertext values for the ciphering of said continuously encoded character set, to an integer set [0 ... N−1], and a corresponding reverse mapping from said integer set [0 ... N−1] to corresponding said N allowable ciphertext values;
   (c) said continuously encoded character set iteratively accessed in increments of size S bits, where S is set according to an application of said system of format-preserving ciphering;
   (d) a key-stream iteratively accessed in increments of said size S bits;
   (e) a limiter value L determined as 2.sup.S minus (2.sup.S modulo N);
   (f) an encryption module comprising a non-transitory storage medium storing computer-readable program instructions and a microprocessor coupled to said non-transitory storage medium for executing said program instructions for encrypting said at least one portion by taking the sum of said forward mapping of said accessed continuously encoded character set in (c) above and modulo N of said accessed key-stream value in (d) above, taking modulo N of said sum to produce a final sum, taking said reverse mapping of said final sum to produce a result, and shifting back in said result by said offset, each character corresponding to said one of said two discontinuously encoded character sets;
   (g) said encryption module ignoring any said accessed key-stream value from said encrypting if said key-stream value is greater than or equal to said limiter value L; and (h) said encryption module skipping zero or more combinations of said S bits in said at least one portion, from said encrypting.

12. The system of claim 11, wherein said format-preserving ciphering preserves an alpha-numeric format of said at least one portion.

13. The system of claim 11, wherein said at least one portion is a composite dataset comprising a plurality of components.

14. The system of claim 13, wherein each of said plurality of components is selected from the group consisting of alpha characters, numeric characters, special characters and binary characters, and wherein said forward mapping and said reverse mapping is uniquely defined for each of said plurality of components.

15. The system of claim 11, wherein said integer set {0 ... N−1} in said forward mapping and said reverse mapping has no particular order.

16. The system of claim 11, wherein said forward mapping maps said allowable ciphertext values as multi-byte values to said integer set {0 ... N−1}, and said corresponding reverse mapping maps said integer set {0 ... N−1} to corresponding said multi-byte allowable ciphertext values, and said size S divided by 8 equals to the number of bytes in each said multi-byte value.

17. The system of claim 16, wherein said format-preserving ciphering is utilized to cipher a financial account number.

18. The system of claim 17, wherein a check-digit from said financial account number is skipped from said format-preserving ciphering, then said check-digit is computed based on the ciphered characters of said credit card number.

19. A system of format-preserving ciphering, comprising:
(a) at least one portion of plaintext data to be ciphered, said at least one portion selected from said plaintext data based on predetermined criteria and said at least one portion consisting of a continuously encoded character set formed by shifting by an offset amongst offsets, each character of each of two or more discontinuously encoded character sets in said at least one portion, said offset corresponding to said each of said two or more discontinuously encoded character sets;
(b) a forward mapping from N allowable ciphertext values for the ciphering of said continuously encoded character set, to an integer set [0 . . . N−1], and a corresponding reverse mapping from said integer set [0 . . . N−1] to corresponding said N allowable ciphertext values;
(c) said continuously encoded character set iteratively accessed in increments of size S bits, where S is set according to an application of said system of format-preserving ciphering;
(d) a key-stream iteratively accessed in increments of said size S bits;
(e) a limiter value L determined as the difference of $2^S$ and ($2^S$ modulo N);
(f) an encryption module comprising a non-transitory storage medium storing computer-readable program instructions and a microprocessor coupled to said non-transitory storage medium for executing said program instructions for encrypting said at least one portion by taking the sum of said forward mapping of said accessed continuously encoded character set in (c) above and modulo N of said accessed key-stream value in (d) above, taking modulo N of said sum to produce a final sum, taking said reverse mapping of said final sum to produce a result, and shifting back each character of said result corresponding to said each of said to or more discontinuously encoded character sets by corresponding said offset;
(g) said encryption module ignoring any said accessed key-stream value from said encrypting if said key-stream value is greater than or equal to said limiter value L; and
(h) said encryption module skipping zero or more combinations of said S bits in said at least one portion, from said encrypting.

20. The system of claim 19 further comprising:
(i) a decryption module comprising a non-transitory storage medium storing computer-readable program instructions and a microprocessor coupled to said non-transitory storage medium for executing said program instructions for iteratively accessing an output 4 of said encryption module in increments of said size S 5 bits, by taking the difference of said forward mapping 6 of said accessed output of said encryption module and 7 modulo N of said accessed key-stream value in (d), 8 taking modulo N of said difference, if said difference 9 is less than 0 then adding N to said difference to 10 produce a final difference, and taking said reverse 11 mapping of said final difference; 12;
(j) said decryption module ignoring any said accessed key- 13 stream value from said decrypting if said key-stream 14 value is greater than or equal to said limiter value L; 15 and 16 (k) said decryption module skipping zero or more 17 combinations of said S bits in said at least one 18 portion, from said decrypting.

* * * * *